Sept. 20, 1938.                G. T. POLLARD                2,130,632
                              POWER TRANSMISSION
                          Filed Dec. 20, 1937           2 Sheets-Sheet 1
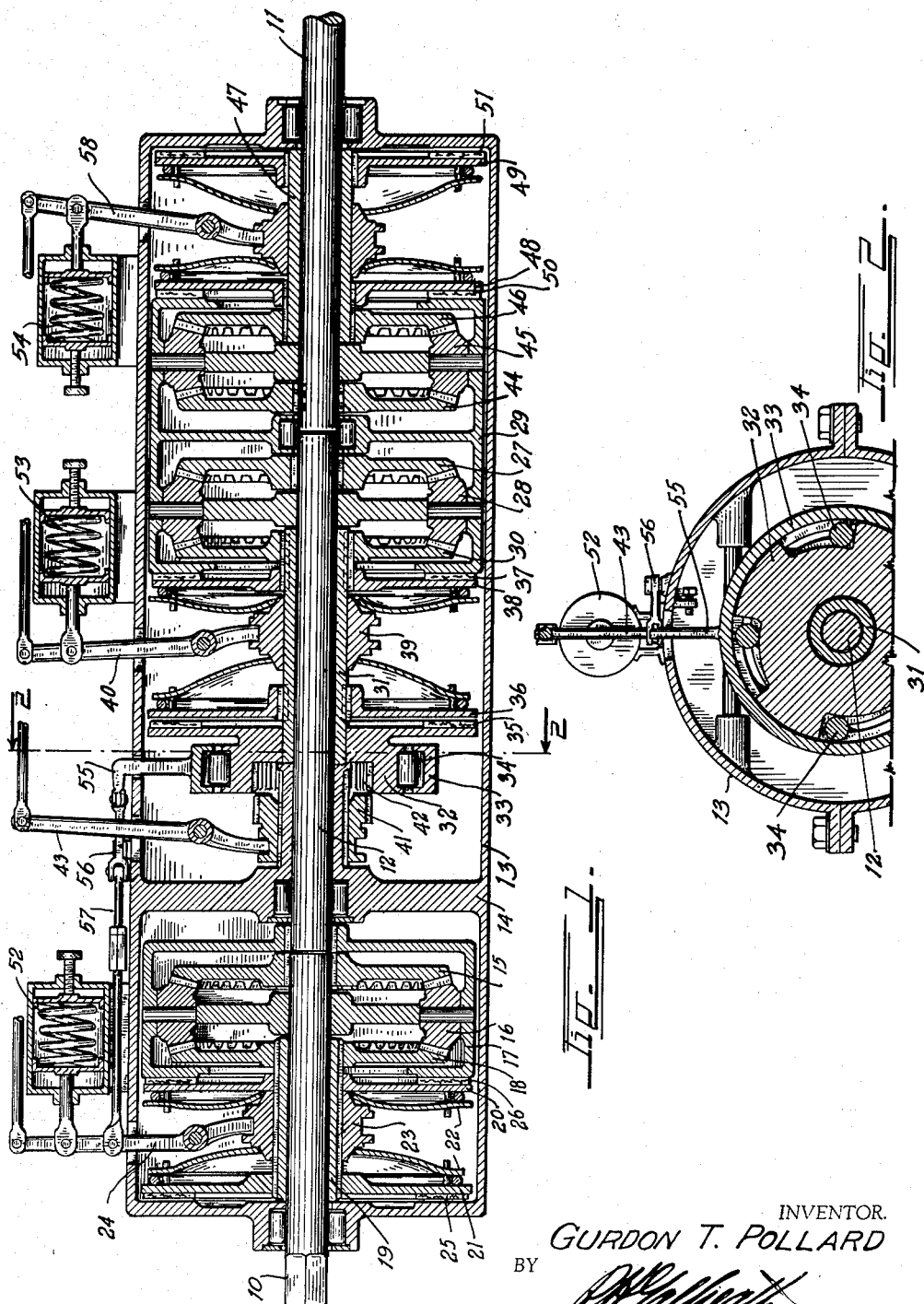
INVENTOR.
GURDON T. POLLARD
BY
                ATTORNEY.

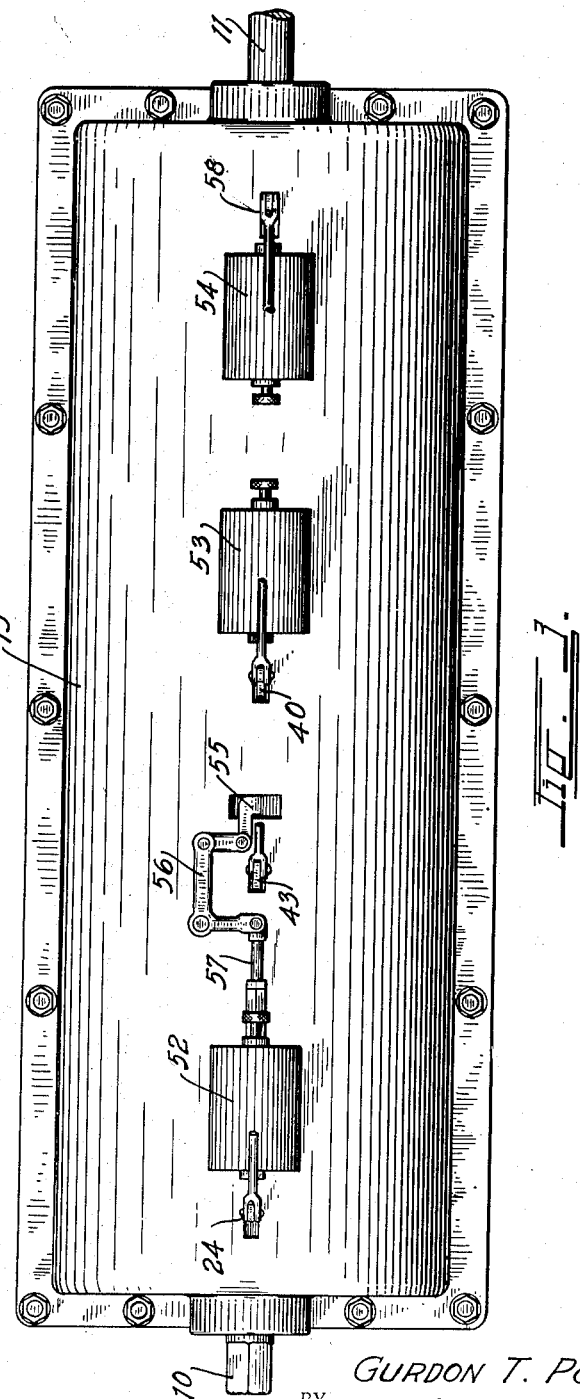

Patented Sept. 20, 1938

2,130,632

UNITED STATES PATENT OFFICE 2,130,632

POWER TRANSMISSION

Gurdon T. Pollard, Denver, Colo.

Application December 20, 1937, Serial No. 180,804

7 Claims. (Cl. 74—259)

This invention relates to an automatic transmission and has for its principal object the provision of a transmission more particularly for use upon automobiles, trucks and other automotive vehicles which will automatically select the most suitable gear ratio in accordance with the load being applied thereto so as to eliminate the present manual, selective gear shifting.

Other objects of the invention are to provide a transmission in which all shifting of gears into and out of mesh with each other is eliminated; to provide a transmission which can be either selectively or automatically operated as desired; to provide a retarded planetary type transmission in which the power usually absorbed by the retarding mechanism will be returned to the power line so that all frictional, braking losses will be eliminated; and to provide a transmission which can be preset or pre-regulated to suit the particular type of automotive vehicle and the particular condition under which it is to be used.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a longitudinal, vertical section through the complete transmission.

Fig. 2 is a cross section taken on the line 2—2, Fig. 1.

Fig. 3 is a plan view thereof.

The drawings and the following description are limited to the novel transmission only. It is to be understood that this transmission is installed in the power line of an automobile, truck, bus, or other automotive vehicle between the engine clutch and the rear differential.

It is also to be understood that the transmission illustrated is for rotation in one direction only and that in order to obtain a reverse rotation reverse gears of any suitable type may be interposed between the driven shaft of the transmission and the propeller shaft of the vehicle in any desired manner.

In the drawings, a drive shaft is indicated at 10 which may be connected with any suitable source of power. The transmission is designed for transmitting power from the drive shaft 10 to a driven shaft 11 at various manually selected or automatically selected power ratios.

An intermediate shaft 12 is positioned between the shafts 10 and 11. The entire transmission is contained in a stationary outer case 13 preferably, but not necessarily, cylindrical in shape. The case 13 is formed with an internal partition or spider 14 which supports one extremity of the intermediate shaft 12 in suitable roller bearings. The inner extremity of the drive shaft 10 terminates in a drive gear 15 which is constantly in mesh with a series of planet gears 16 mounted for revolution in a first planet housing 17 which is keyed to the intermediate shaft 12. The planet gears 16 are also constantly in mesh with a sun gear 18 which is fixed upon the extremity of a clutch sleeve 19.

Two slidable clutch plates 20 and 21 are splined upon the clutch sleeve 19 so that they must rotate therewith. The clutches illustrated are of the "Chevrolet" type which employ dished spring discs 22 for forcing the clutch plates into the engaged position. The discs are actuated by means of a clutch cone 23 which is shifted along the sleeve 19 by means of a pivoted yoke lever 24. The clutches could, however, be of any desired type.

The clutch plate 21 engages a stationary clutching surface 25 on the case 13. The clutch plate 20 engages a similar clutching surface 26 on the first planet housing 17.

The intermediate shaft 12 terminates in an intermediate gear 27 which is constantly in mesh with a second series of planet gears 28 mounted in a second planet housing 29. The planet gears 28 are constantly in mesh with a second sun gear 30 fixed on the extremity of a clutch sleeve 31 which terminates at its other extremity in an inner ratchet member 32. The latter cooperates with an outer ratchet member 33, through the medium of ratchet rollers 34, to prevent reverse rotation of the sun gear 30 but to allow forward rotation thereof.

The inner ratchet member 32 carries a clutching surface 35 which cooperates with a clutch plate 36. The housing 29 carries a similar clutching surface 37 which cooperates with a clutch plate 38. The clutch plates 36 and 38 are alternately engaged through the medium of a clutch cone 39 operated from a pivoted yoke lever 40 similarly to the first described pair of clutches.

A sliding toothed clutch dog 41 is splined upon a projection from the partition 14 so that it may be moved into engagement with internal teeth 42 in the inner ratchet member 32 by means of a yoke lever 43. Thus, when desired, the sun gear 30 may be locked against rotation in either direction.

The driven shaft 11 terminates within the second planet housing 29 in a driven gear 44 which is constantly in mesh with a third series of planet gears 45. The planet gears 45 are constantly in mesh with a third sun gear 46, fixed upon the extremity of a clutch sleeve 47 carrying two splined clutch plates 48 and 49. The clutch plate 48 acts against a friction surface 50 on the planet housing 29 and the clutch plate 49 acts against a stationary clutching surface 51 on the stationary case 13. The clutch plates 48 and 49 are alternately engaged through the medium of a yoke lever 58.

Operation

*First planet housing.*—It can be readily seen that if both clutch plates 20 and 21 are free, the power will be transmitted to the drive gear 15 thence through the planet gears 16 to the sun gear 18 in reverse direction without imparting any rotation to the planet housing 17. If the clutch plate 21 is engaged this will stop rotation of the sun gear 18 and cause the planet gears 16 to act as traction gears around the stationary sun gear 18 thus rotating the first planet housing and, through it, the intermediate shaft 12 at a ratio of 2 to 1. If the clutch plate 20 is engaged, the sun gear 18 will be locked to the planet housing so that the latter will rotate as a unit with the drive shaft 10 to drive the intermediate shaft 12 at a ratio of 1 to 1.

*Second planet sets.*—Let us assume that the clutch plate 36 is engaged so that the sun gear 30 can not rotate rearwardly. The shaft 12 drives the gears 27 forwardly to rotate the second series of planet gears 28. These gears attempt to rotate the sun gear 30 rearwardly but cannot do so due to the direction of the ratchet rollers 34, they, therefore, travel around the sun gear and carry the second planet housing forwardly at a ratio of 2 to 1.

Let us assume that the yoke 40 is shifted to release the clutch plate 36 and engage the clutch plate 38. This causes the second planet housing 29 to rotate as a unit with the intermediate shaft 12 with a ratio of 1 to 1.

*Third planet set.*—The rotation of the planet housing is transmitted to the driven shaft 11 through the medium of the third sun gear 46, the third planet gears 45, and the drive gear 44. Should the clutch plate 48 be engaged, the sun gear 46 will rotate with the housing and with the planet gears to transmit the power through to shaft 11 at a ratio of 1 to 1. Should the clutch plate 49 be engaged, the third sun gear will remain stationary and the planet gears 45 will be revolved around it causing them to transmit the power to the driven gear 44 with a ratio of 1 to 2 so that an increase in speed or over drive is obtained. Therefore, by manipulation of the yoke levers 24, 40, and 58 we can obtain a balance of power or a trading of ratios to produce total or final ratios between the drive and driven shafts shown on the following table:

| | | | | |
|---|---|---|---|---|
| Low | 21 closed | 36 closed | 48 closed | Ratio 4 to 1 |
| Intermediate | 20 closed | 36 closed | 48 closed | Ratio 2 to 1 |
| High | 20 closed | 38 closed | 48 closed | Ratio 1 to 1 |
| Over drive | 20 closed | 38 closed | 49 closed | Ratio 1 to 2 |

Therefore, it will be seen that there are four different final fixed positions or ratios to wit:— low, intermediate, high, and over drive. Between these fixed positions are an infinite number of temporary ratios, for instance, in going from "low" to "intermediate," the clutch 20 in closing will slip temporarily which will gradually bring the ratio from 4-1, to 2-1, through all intermediate ratios. A similar graduated action occurs. In moving from "intermediate" to "high", the clutch 48 in closing will slip to the engaged position and gradually bring the ratio from 2-1, to 1-1. In moving to the "over drive" position, the slippage of the clutch 49 will act to bring the ratios gradually from 1-1, to 1-2. Therefore, we have a gradual decrease in ratio from the 4-1, or "low" position to the 1-2 or "over drive" position depending upon the balance of power.

The various yoke levers can be shifted or held fixed in any desired way, such as by means of manually operated linkage, hydraulic cylinders, etc. or they can be automatically operated in accordance with the load applied to the driven shaft 11.

Automatic shifting

For automatic operation three adjustable springs 52, 53, and 54 are employed for the yoke levers 24, 40, and 58, respectively. These cooperate with the spring discs 22 to give any desired combination of balanced friction. As illustrated, the springs 52, 53, 54 act to normally hold the clutch plates 20, 38, and 48 closed so that the transmission is normally in the "high" position with a ratio of 1-1.

The outer ratchet member 32 is formed with a ratchet arm 55 connected through a bell crank lever 56 with a connecting rod 57 to the yoke lever 24.

Let us assume that the transmission is operating in the "high" position illustrated and that the automotive vehicle encounters a hill or other resistance. This causes the reaction against the sun gear 30 to increase. In other words its tendency to rotate rearwardly increases. Since this rearward rotation is prevented by the ratchet rollers 34, this rearward reaction will be transmitted to the outer ratchet member 33 and, through the levers 55 and 56, to the connecting rod 57 causing it to pull upon the yoke lever 24 to release the clutch plate 20 and engage the clutch plate 21. This gradually brings the ratio from 1-1, to 2-1, if, and as, necessary to accommodate the increased load upon the shaft 11. As soon as this load decreases the reaction of the lever 55 will decrease and balance the power allowing the spring 52 to again return to the clutch plate 20 to resume the "high," 1 to 1, position.

Coasting

Let us assume that the automotive vehicle is coasting and power is being supplied through the shaft 11. This will be transmitted through the second and third planetary sets to the sun gear 30 and from thence to the inner ratchet member 32 in a forward direction. Since the ratchet rollers 34 allow rotation in a forward direction, the inner ratchet member rotates freely without transmitting power to the first planet housing. We thus have what is known as "free wheeling," that is, the vehicle can coast freely without turning the engine.

Should "free wheeling" not be desired, however, as when it is desirable to use the engine compression as a retarding brake, the clutch dog 41 can be slid into engagement with the teeth 42 of the inner ratchet member by operation of the yoke member 43. This locks the inner ratchet member stationary and holds the sun gear 30 from rotating. This causes the shaft 11 to drive the intermediate shaft 12 and transmit the power through the first planet housing and through the drive shaft 10 to the engine so that the latter can be used as a resisting force.

It is desired to call attention to the fact that the mechanism serves also as a clutch so that a main clutch is not necessary since the clutch plates 20 and 21 can be used for starting purposes without other clutching means if desired.

One of the novel features of this invention is the use of the reactance force from a planetary type transmission for shifting clutches to bring the required power ratios into service.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. In a transmission device of the type having a drive gear, planet gears in mesh with the drive gear and free to revolve thereabout and a sun gear in mesh with the planet gears, means for preventing said sun gear from rotating reversely while allowing said sun gear to rotate forwardly; and means for employing the tendency of said sun gear to reverse to actuate a transmission device to obtain a lower gear ratio.

2. A power transmission device comprising: a drive shaft; a drive gear fixed on said drive shaft; a planet housing about said drive shaft; a series of planet gears rotatably mounted in said housing in mesh with said drive gear; a sleeve on said shaft projecting from said housing; a sun gear fixed on said sleeve in mesh with said planet gears; a braking mechanism for causing said sleeve to rotate with said housing or to remain stationary when desired; an intermediate shaft keyed to said housing; an intermediate gear keyed to said intermediate shaft; a second planet housing surrounding said intermediate gear; a second series of planet gears mounted in said second housing in mesh with and rotating around said intermediate gear; a second sleeve projecting from said second housing; a second sun gear fixed to said second sleeve in mesh with said second planet gears; a ratchet member rotatably mounted about said intermediate shaft to prevent rearward rotation of said second sun gear; and a stationary ratchet member preventing rearward rotation of said rotatable ratchet member.

3. A power transmission device comprising: a drive shaft; a drive gear fixed on said drive shaft; a planet housing about said drive shaft; a series of planet gears rotatably mounted in said housing in mesh with said drive gear; a sleeve on said shaft projecting from said housing; a sun gear fixed on said sleeve in mesh with said planet gears; a braking mechanism for causing said sleeve to rotate with said housing or to remain stationary when desired; an intermediate shaft keyed to said housing; an intermediate gear keyed to said intermediate shaft; a second planet housing surrounding said intermediate gear; a second series of planet gears mounted in said second housing in mesh with and rotating around said intermediate gear; a second sleeve projecting from said second housing; a second sun gear fixed to said second sleeve in mesh with said second planet gears; a ratchet member rotatably mounted about said intermediate shaft; a stationary ratchet member cooperating with said rotatable ratchet member to prevent rearward rotation of the latter; and means for connecting said rotatable ratchet member to said intermediate gear to prevent rearward rotation of the latter.

4. A power transmission device comprising: a drive shaft; a drive gear fixed on said drive shaft; a planet housing about said drive shaft; a series of planet gears rotatably mounted in said housing in mesh with said drive gear; a sleeve on said shaft projecting from said housing; a sun gear fixed on said sleeve in mesh with said planet gears; a braking mechanism for causing said sleeve to rotate with said housing or to remain stationary when desired; an intermediate shaft keyed to said housing; an intermediate gear keyed to said intermediate shaft; a second planet housing surrounding said intermediate gear; a second series of planet gears mounted in said second housing in mesh with and rotating around said intermediate gear; a second sleeve projecting from said second housing; a second sun gear fixed to said second sleeve in mesh with said second planet gears; a ratchet member rotatably mounted about said intermediate shaft; a stationary ratchet member cooperating with said rotatable ratchet member to prevent rearward rotation of the latter; means for connecting said rotatable ratchet member to said intermediate gear to prevent rearward rotation of the latter; and means for transmitting the reaction of said stationary ratchet member to operate said braking mechanism.

5. A power transmission device comprising: a drive shaft; a drive gear fixed on said drive shaft; a planet housing about said drive shaft; a series of planet gears rotatably mounted in said housing in mesh with said drive gear; a sleeve on said shaft projecting from said housing; a sun gear fixed on said sleeve in mesh with said planet gears; a braking mechanism for causing said sleeve to rotate with said housing or to remain stationary when desired; an intermediate shaft keyed to said housing; an intermediate gear keyed to said intermediate shaft; a second planet housing surrounding said intermediate gear; a second series of planet gears mounted in said second housing in mesh with and rotating around said intermediate gear; a second sleeve projecting from said second housing; a second sun gear fixed to said second sleeve in mesh with said second planet gears; a ratchet member rotatably mounted about said intermediate shaft; a stationary ratchet member cooperating with said rotatable ratchet member to prevent rearward rotation of the latter; means for connecting said rotatable ratchet member to said intermediate gear to prevent rearward rotation of the latter; means for transmitting the reaction of said stationary ratchet member to operate said braking mechanism; and means for causing said second planet housing to rotate with said intermediate shaft when desired.

6. A power transmission device comprising: a drive shaft; a drive gear fixed on said drive shaft; a planet housing about said drive shaft; a series of planet gears rotatably mounted in said housing in mesh with said drive gear; a sleeve on said shaft projecting from said housing; a sun gear fixed on said sleeve in mesh with said planet gears; a braking mechanism for causing said sleeve to rotate with said housing or to remain stationary when desired; an intermediate shaft keyed to said housing; an intermediate gear keyed to said intermediate shaft; a second planet housing surrounding said intermediate gear; a second series of planet gears mounted in said second housing in mesh with and rotating around said intermediate gear; a second sleeve projecting from said second housing; a second sun gear fixed to said second sleeve in mesh with said second planet gears; a ratchet member rotatably mounted about said intermediate shaft; a stationary ratchet member cooperating with said rotatable ratchet member to prevent rearward rotation of the latter; means for connecting said rotatable ratchet member to said intermediate gear to prevent rearward rotation of the latter; means for transmitting the reaction of said stationary ratchet member to operate said braking mechanism; means for causing said second planet housing to rotate with said intermediate shaft when desired; a driven shaft extending from said second housing; a driven gear fixed to said driven shaft within said second housing; a third series of planet gears mounted in said second housing in mesh with said driven gear; a third sun gear in said second housing in mesh with said third planet gears; a sleeve carrying said third sun gear and projecting from said planet housing; and means for connecting said sleeve either to said second planet housing or to a stationary member.

7. In a transmission device of the planetary type having a planet housing with planet gears in said housing and a sun gear in mesh with said planet gears, means for preventing the sun gear from exceeding the rotation of the planet housing comprising: a first braking means automatically operating between said sun gear and said housing to prevent the latter from overspeeding the housing; and a second braking means for preventing rearward rotation of said sun gear.

GURDON T. POLLARD.